United States Patent
Nakabayashi

(10) Patent No.: US 10,762,729 B2
(45) Date of Patent: Sep. 1, 2020

(54) WIRELESS CARD READER SYSTEM

(71) Applicant: DENSO WAVE INCORPORATED, Chita-gun, Aichi-pref. (JP)

(72) Inventor: Masahiro Nakabayashi, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 0 days.

(21) Appl. No.: 16/255,375

(22) Filed: Jan. 23, 2019

(65) Prior Publication Data

US 2019/0304222 A1    Oct. 3, 2019

(30) Foreign Application Priority Data

Mar. 30, 2018   (JP) .................. 2018-068354

(51) Int. Cl.
  *G07C 9/00*   (2020.01)
  *G06K 7/10*   (2006.01)
  *G07C 9/28*   (2020.01)

(52) U.S. Cl.
  CPC ..... *G07C 9/00182* (2013.01); *G06K 7/10207* (2013.01); *G06K 7/10366* (2013.01); *G07C 9/28* (2020.01)

(58) Field of Classification Search
  CPC ...................................... H02J 50/10
  USPC ....................................... 340/5.6
  See application file for complete search history.

(56) References Cited

U.S. PATENT DOCUMENTS

| | | | |
|---|---|---|---|
| 2009/0256684 A1* | 10/2009 | Fukuda | G06K 19/07732 340/10.3 |
| 2014/0049365 A1* | 2/2014 | Ahearn | G07C 9/00174 340/5.51 |
| 2017/0018956 A1* | 1/2017 | Geiszler | H02J 7/00034 |

FOREIGN PATENT DOCUMENTS

JP          2011-210219 A    10/2011

* cited by examiner

*Primary Examiner* — Fabricio R Murillo Garcia
(74) *Attorney, Agent, or Firm* — Oliff PLC

(57) ABSTRACT

A wireless card reader system includes: a card reader terminal that is battery-driven and obtains card data for verification; a high-order host apparatus that verifies the card data, changes an operating state of a target device when a verification result is successful, and sends the verification result; and an interface apparatus that relays communication between the card reader terminal and the high-order host apparatus. The card reader terminal is operable in a normal mode or in a sleep mode. The card reader terminal switches to the sleep mode after sending the card data in the normal mode. The card reader terminal temporarily returns from the sleep mode to the normal mode to perform polling to the interface apparatus, and obtains the verification result. The polling is performed less frequently in a period before a state change than in a period after the state change.

6 Claims, 7 Drawing Sheets

WIRELESS CARD READER SYSTEM

CROSS REFERENCE TO RELATED APPLICATION

The present application claims the benefit of priority from Japanese Patent Application No. 2018-068354 filed on Mar. 30, 2018. The entire disclosures of all of the above applications are incorporated herein by reference.

TECHNICAL FIELD

The present disclosure relates to a wireless card reader system.

BACKGROUND

A related art discloses an entry/exit management system including a card reader and an entry/exit controller. A card reader may be referred to as a card reader terminal in the present application.

SUMMARY

The present disclosure may provide a wireless card reader system including: a card reader terminal, a high-order host apparatus, and an interface apparatus. The card reader terminal is battery-driven and obtains card data stored in a card for verification. The high-order host apparatus verifies the card data, changes an operating state of a target device when a verification result is successful, and sends the verification result. The interface apparatus relays communication between the card reader terminal and the high-order host apparatus.

BRIEF DESCRIPTION OF DRAWINGS

The above and other objects, features, and advantages of the present disclosure will become more apparent from the following detailed description with reference to the accompanying drawings. In the drawings.

DETAILED DESCRIPTION

Figure 1:
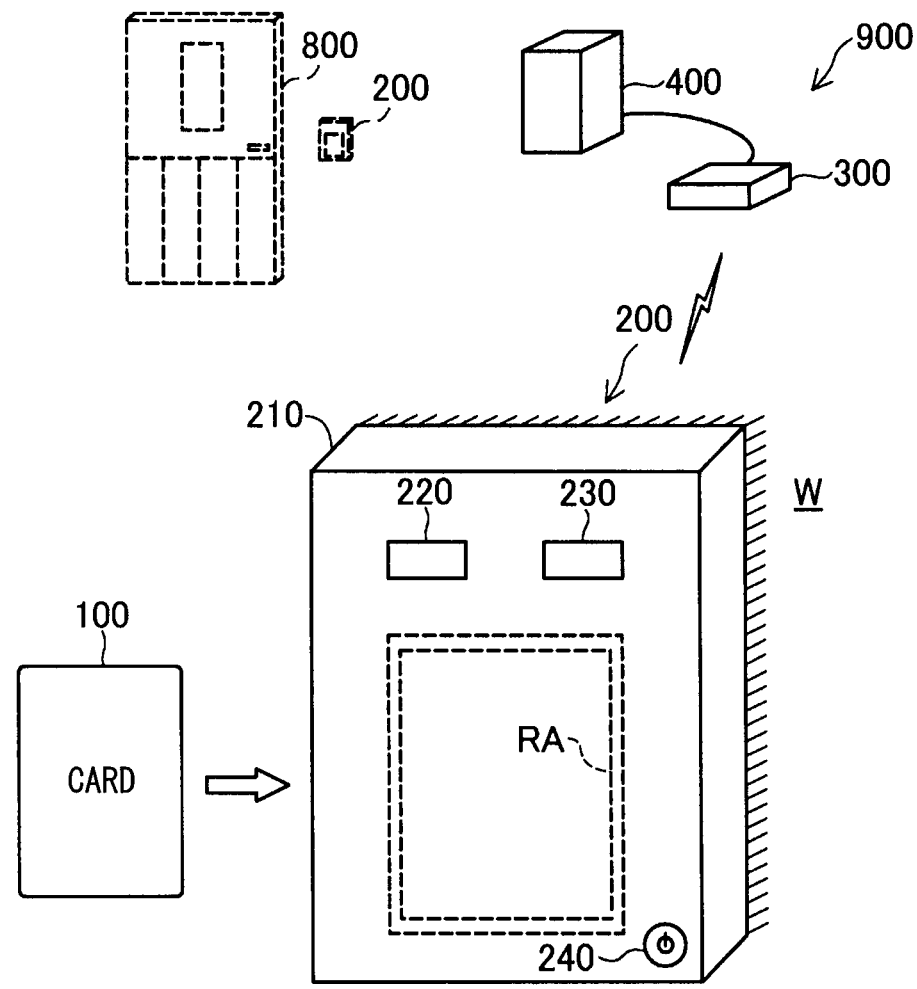
FIG. 1 is a schematic external view of a wireless card reader system in a first embodiment.

The inventor of the present application has found the following.

When a card reader terminal is of a battery-driven type, saving power consumption as much as possible may be an issue. At the same time, it may be preferable to prevent from giving a user a strange feeling due to a delay in response from the card reader terminal caused by reduced power consumption.

According to one embodiment of the present disclosure, a wireless card reader system is provided. The wireless card reader system may include: a battery-driven card reader terminal that obtains verification card data stored in a card; a high-order host apparatus that verifies the card data and changes an operating state of a target device when verification is successful; and an interface apparatus that relays communications between the card reader terminal and the high-order host apparatus. The card reader terminal may be operable in a normal mode and in a sleep mode with lower power consumption than that of the normal mode, and switch to the sleep mode after sending the card data to the interface apparatus in the normal mode. The card reader terminal may temporarily return from the sleep mode to the normal mode to perform polling to the interface apparatus so as to obtain a verification result sent from the high-order host apparatus to the interface apparatus. The polling may be performed less frequently in a period before a state change, which is a period before a first time corresponding to a time at which the operating state of the target device is changed by the high-order host apparatus, than in a period after a state change, which is a period after the first time.

According to the wireless card reader system of this embodiment, the polling frequency in the period before a state change is lower than the polling frequency in the period after a state change, so that the power consumption of the card reader terminal can be reduced. Reducing the polling frequency during the period before a state change may be hardly likely to give a user a strange feeling because the user is expected to wait until the first time without feeling strange after holding up the card over the card reader terminal.

In the wireless card reader system of the embodiment above, the high-order host apparatus may be configured such as to additionally send a successful verification result and a state change result of the operating state to the interface apparatus when the verification of the card data is successful, and to send an unsuccessful verification result to the interface apparatus without changing the operating state when the verification of the card data is unsuccessful.

With the wireless card reader system of this embodiment, the card reader terminal can receive an unsuccessful verification result from the interface apparatus.

In the wireless card reader system, the interface apparatus includes a memory, and stores the verification result and the state change result sent from the high-order host apparatus in the memory. The interface apparatus may be configured such that, when polled, it sends the successful verification result to the card reader terminal if the successful verification result and the state change result have been stored; sends a response indicating that a state change is ongoing to the card reader terminal if only the successful verification result has been stored; and sends the unsuccessful verification result to the card reader terminal if the unsuccessful verification result has been stored.

According to the wireless card reader system of this embodiment, the interface apparatus can store verification results and state change results, and can provide these verification results and state change results to the card reader terminal when polled by the card reader terminal.

In the wireless card reader system of the embodiment above, the card reader terminal may switch to the sleep mode after receiving the response indicating that a state change is ongoing from the interface apparatus.

According to the wireless card reader system of this embodiment, the card reader terminal switches to the sleep mode when it receives a response indicative of a state change being ongoing, which enables further saving of the power consumption of the card reader terminal.

In the wireless card reader system of the embodiment above, the card reader terminal may perform the polling at the first time.

According to the wireless card reader system of this embodiment, a verification result of card data is highly likely to be sent to the interface apparatus at the first time, which can increase the probability for the card reader terminal to obtain a verification result of card data.

First Embodiment

FIG. 1 is a schematic external view of a wireless card reader system 900 in a first embodiment of the present disclosure. The wireless card reader system 900 includes a card reader terminal 200, an interface apparatus 300, and a high-order host apparatus 400. In the example of FIG. 1, a card 100 and the card reader terminal 200 perform wireless communications with each other. The card reader terminal 200 and the interface apparatus 300 perform wireless communications with each other. The interface apparatus 300 and the high-order host apparatus 400 perform wired communications with each other. The high-order host apparatus 400 is a device that manages the operating states, i.e., the locked state or unlocked state, of an electric lock door 800 (corresponding to a target device). The interface apparatus 300 is a device that relays the communications between the card reader terminal 200 and the high-order host apparatus 400. The card reader terminal 200 is installed in a wall W in the vicinity of the electric lock door 800. The card reader terminal 200 is the object to be operated on by a user using the card 100 to unlock the electric lock door 800.

The card reader terminal 200 includes a card reader case 210, a lock lamp 220, an unlock lamp 230, and a start switch 240. In the example of FIG. 1, when the start switch 240 is pressed, the lock lamp 220 that indicates the locked state of the electric lock door 800 lights up. When the electric lock door 800 is unlocked, the unlock lamp 230 that indicates the unlocked state lights up. After the card reader terminal 200 is started up, when the user brings the card 100 close to a reading area RA of the card reader case 210, verification card data stored in the card 100 is read by the card reader terminal 200, and transmitted to the high-order host apparatus 400 via the interface apparatus 300. The high-order host apparatus 400 verifies the card data, and transmits the verification result to the card reader terminal 200 via the interface apparatus 300. The card reader terminal 200 lights up the lamp 220 or 230 in accordance with the verification result to notify the user of the operating state of the electric lock door 800. The card reader terminal 200 may be a contact type card reader terminal, such as, for example, a slide-type card reader terminal.

Figure 2:
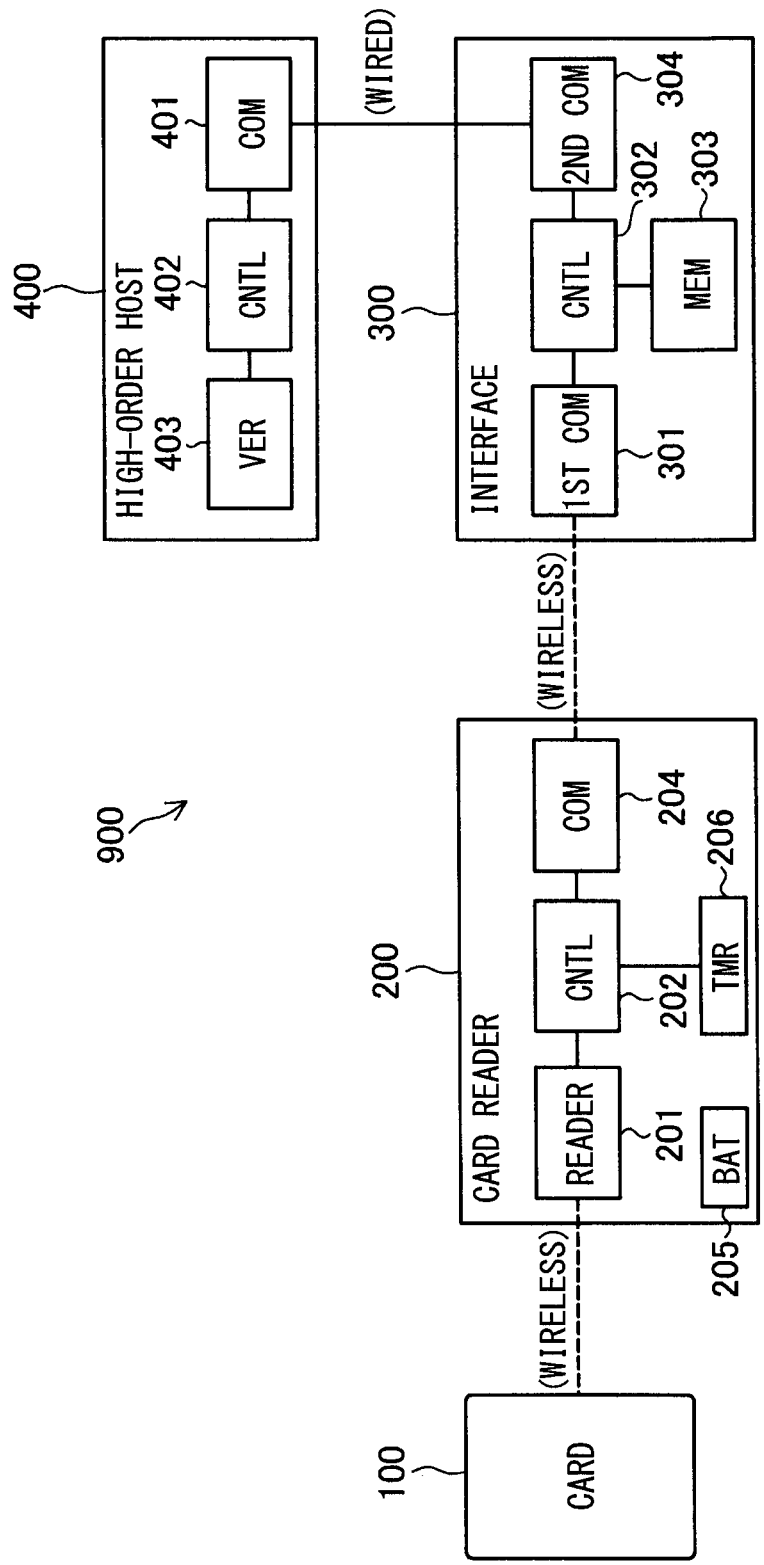
FIG. 2 is a block diagram showing the configuration of the wireless card reader system.

FIG. 2 is a block diagram illustrating the configuration of the wireless card reader system 900 in the first embodiment of the present disclosure. The card reader terminal 200 includes a reader 201, a controller 202, a communication portion 204, a battery 205, and a timer 206. The reader 201 is provided to a position corresponding to the reading area RA (FIG. 1) of the card reader case 210 and reads out verification card data of the card 100 in accordance with control signals from the controller 202. The communication portion 204 sends and receives data to and from the interface apparatus 300 in accordance with control signals from the controller 202. The controller 202 is configured by a microcomputer having a central processing unit and controls operations of the reader 201 and communication portion 204. The controller 202 can make the card reader terminal 200 operate in a normal mode and in a sleep mode that consumes less power than the normal mode. The controller 202 switches the card reader terminal 200 from the normal mode to the sleep mode after card data of the card 100 has been transmitted from the communication portion 204 to the interface apparatus 300. The controller 202 causes the card reader terminal 200 to return temporarily from the sleep mode to the normal mode to perform polling to the interface apparatus 300 at intervals determined by timer interrupts from the timer 206. The card reader terminal 200 can obtain verification results of card data through polling. A way that a time when timer interrupts occur, i.e., the polling times are set, will be described later. The controller 202 controls lighting of the lamps 220, 230 (FIG. 1). The battery 205 is a power source that drives various parts of the card reader terminal 200. The card reader terminal 200 is of a battery-driven type. In other words, the card reader terminal 200 is disconnected to a commercial power supply by wire. In the sleep mode, a part of functions of the card reader terminal 200 may be restricted. For example, in the sleep mode, a part of functions of the communication portion 204 related to at least one of wireless transmission or wireless reception between the card reader terminal 200 and the interface apparatus 300 may be stopped.

The interface apparatus 300 includes a first communication portion 301, a controller 302, a memory 303, and a second communication portion 304. The first communication portion 301 sends and receives data to and from the communication portion 204 of the card reader terminal 200 in accordance with control signals from the controller 302. The second communication portion 304 sends and receives data to and from the high-order host apparatus 400 in accordance with control signals from the controller 302. The controller 302 is configured by a microcomputer having a central processing unit and controls operations of the first communication portion 301 and second communication portion 304. The controller 302 stores verification results of card data and state change results received by the second communication portion 304 in the memory 303.

The high-order host apparatus 400 includes a communication portion 401, a controller 402, and a verification section 403. The communication portion 401 sends and receives data to and from the second communication portion 304 of the interface apparatus 300 in accordance with control signals from the controller 402. The verification section 403 verifies the card data received by the communication portion 401 in accordance with control signals from the controller 402. The controller 402 is configured by a microcomputer having a central processing unit and controls operations of the communication portion 401 and verification section 403. The controller 402 changes the operating state of the electric lock door 800 from the locked state to the unlocked state when the verification of the card data by the verification section 403 is successful. When the verification of the card data is unsuccessful, the controller 402 does not change the operating state of the electric lock door 800.

The high-order host apparatus 400 and the interface apparatus 300 may perform wireless communications. The high-order host apparatus 400 and the interface apparatus 300 may preferably be connected to a commercial power supply by wire rather than driven by batteries.

Figure 3:
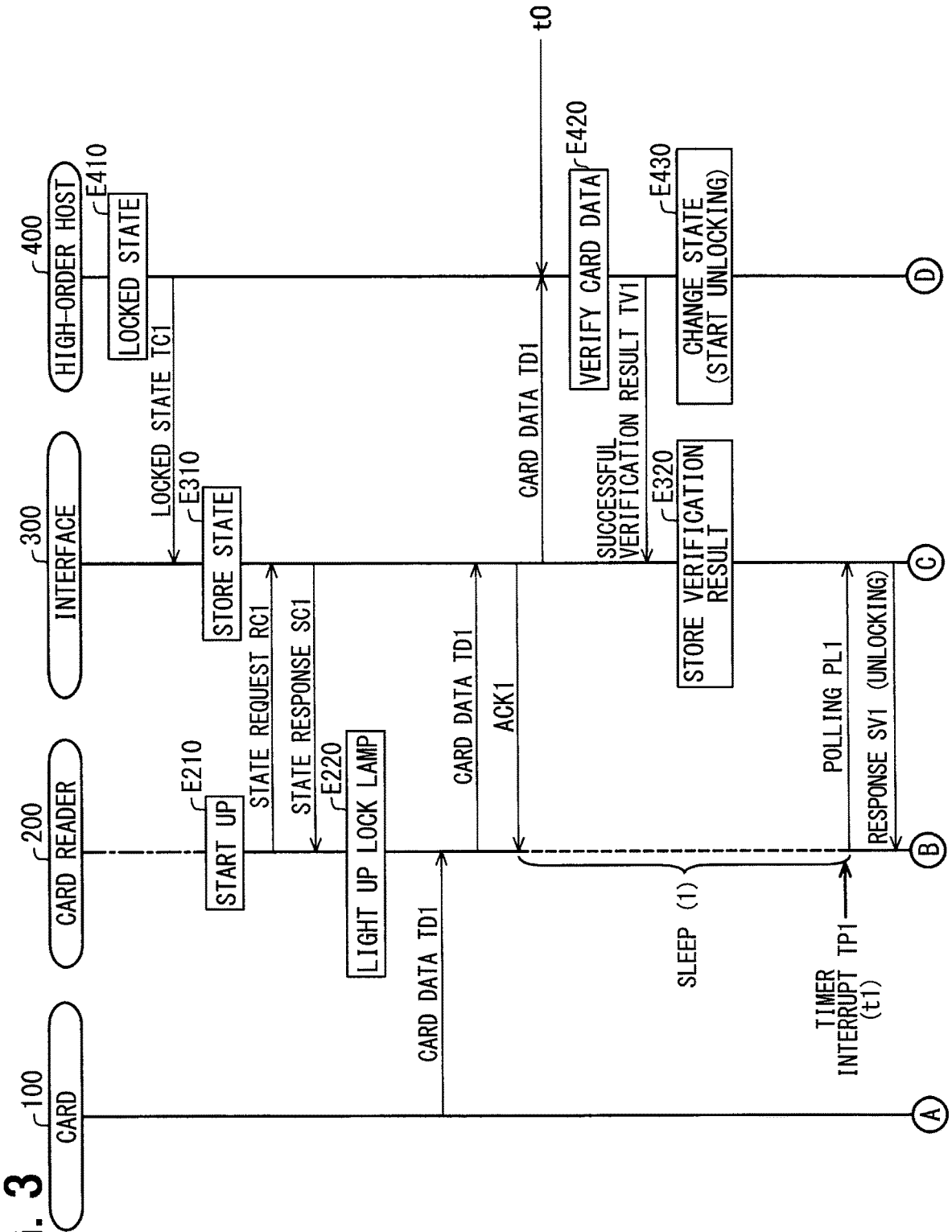
FIG. 3 is a sequence diagram of card verification processes.
Figure 4:
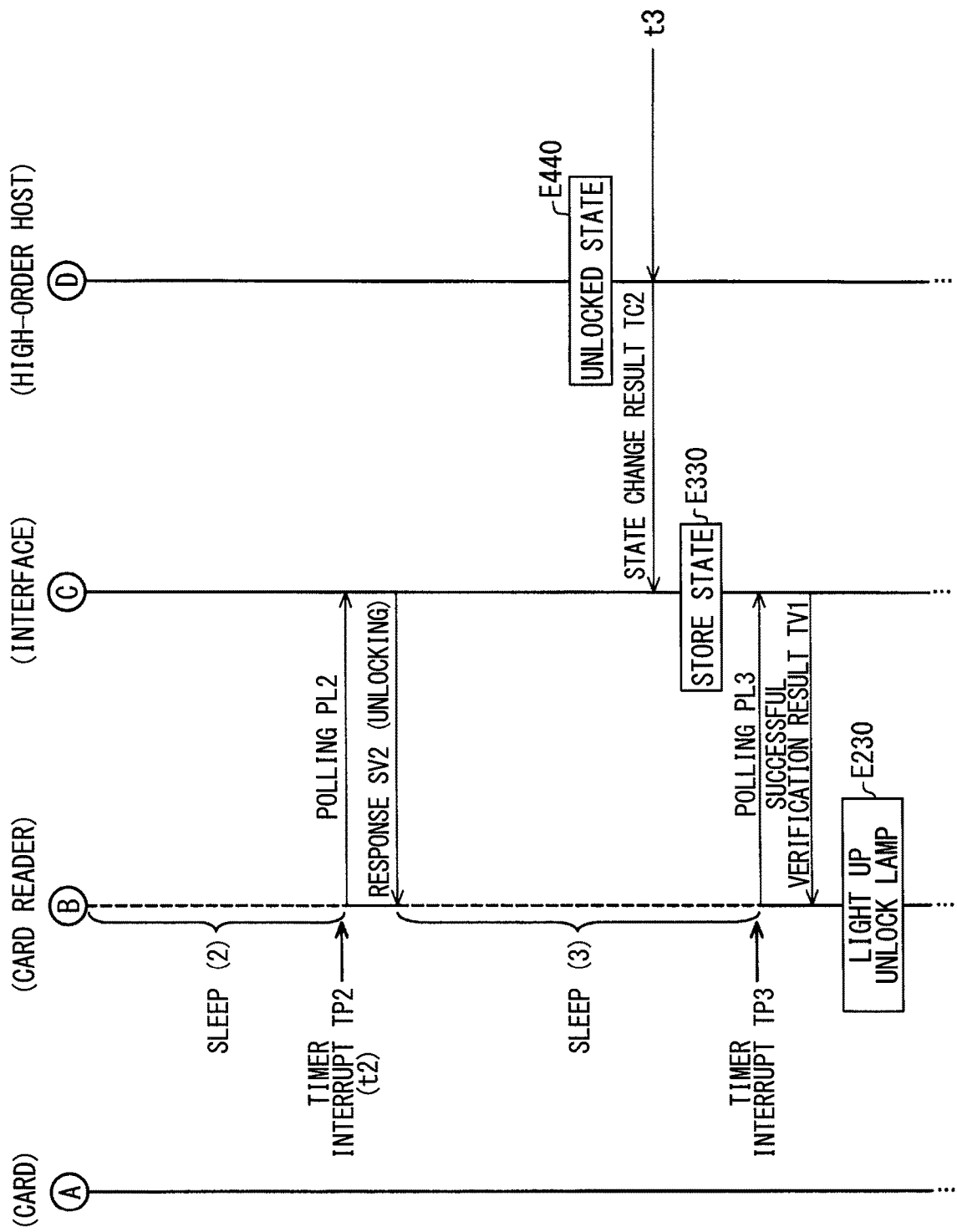
FIG. 4 is a sequence diagram of card verification processes.

FIG. 3 and FIG. 4 are sequence diagrams showing an example of the card verification process flow in the first embodiment. FIG. 3 and FIG. 4 show an example in which the verification of card data is successful. In FIG. 3 and FIG. 4, solid lines and broken lines indicate the normal mode and the sleep mode of the card reader terminal 200, respectively. The one dot chain line before Event E210 shown in FIG. 3 indicates a state with zero power consumption.

In the example of FIG. 3, the operating state of the electric lock door 800 kept by the high-order host apparatus 400 before card verification is a locked state (Event E410). The high-order host apparatus 400 sends the locked state TC1 to the interface apparatus 300, and the interface apparatus 300 stores the locked state TC1 (Event E310) in the memory 303 (FIG. 2). The card reader terminal 200, when started up (Event E210), assumes the normal mode, and sends a state request RC1 to the interface apparatus 300. When the interface apparatus 300 receives the state request RC1, it sends a state response SC1 to the card reader terminal 200 in accordance with the locked state TC1. The card reader terminal 200 lights up (Event E220) the lock lamp 220 (FIG. 1) in accordance with the state response SC1.

After the lock lamp 220 is lit up, the card reader terminal 200 reads the verification card data TD1 of the approaching card 100. After that, the card reader terminal 200 sends the card data TD1 to the interface apparatus 300. The interface apparatus 300, after receiving the card data TD1, immediately sends an affirmative response ACK1 to the card reader terminal 200. This affirmative response ACK1 may preferably be issued by the interface apparatus 300 without waiting for completion of the communication with the high-order host apparatus 400 for verification of the card data (reception of the verification result), in particular, before the card data is sent to the high-order host apparatus 400. When the card reader terminal 200 receives the affirmative response ACK1, it switches to the sleep mode (first time) in accordance therewith. The card reader terminal 200 may send the card data again to the interface apparatus 300 if it fails to receive the affirmative response ACK1 within a predetermined period of time. The interface apparatus 300 need not necessarily send the affirmative response ACK1 to the card reader terminal 200. In this case, the card reader terminal 200 may switch to the sleep mode after sending the card data TD1 to the interface apparatus 300 without waiting for a response from the interface apparatus 300.

The interface apparatus 300 sends the card data TD1 to the high-order host apparatus 400 as well as sends the affirmative response ACK1 to the card reader terminal 200. The high-order host apparatus 400, after receiving the card data TD1, verifies the card data TD1 (Event E420). After that, the high-order host apparatus 400 sends a successful verification result TV1 of the card data to the interface apparatus 300. The high-order host apparatus 400 at the same time starts changing the operating state of the electric lock door 800 (Event E430), i.e., starts the process of unlocking the electric lock door 800. This unlocking process requires some time to complete. When the process of unlocking the electric lock door 800 is completed, the high-order host apparatus 400 goes on to the next event E440 (FIG. 4). The interface apparatus 300, after receiving the successful verification result TV1, stores the successful verification result TV1 (Event E320).

The card reader terminal 200 temporarily switches from the first-time sleep mode to the normal mode in accordance with a timer interrupt TP1 from the timer 206 (FIG. 2) to perform first polling PL1 to the interface apparatus 300. At this time, the process of unlocking the electric lock door 800 by the high-order host apparatus 400 is not completed yet, and the interface apparatus 300 has only the successful verification result stored therein. When this is the case, the interface apparatus 300 sends a response SV1 indicative of an ongoing state change (unlocking) to the card reader terminal 200.

When the card reader terminal 200 receives the response SV1 indicative of the ongoing state change, it switches to the sleep mode for a second time as shown in FIG. 4. After that, the card reader terminal 200 temporarily switches from the second-time sleep mode to the normal mode in accordance with a timer interrupt TP2 from the timer 206 to perform polling PL2 for a second time to the interface apparatus 300. At this time, the process of unlocking the electric lock door 800 by the high-order host apparatus 400 is still not completed yet, and the interface apparatus 300 has only the successful verification result stored therein. Therefore, the interface apparatus 300 sends a response SV2 indicative of an ongoing state change (unlocking) to the card reader terminal 200.

When the card reader terminal 200 receives the response SV2 indicative of the ongoing state change, it switches to the sleep mode for a third time. The high-order host apparatus 400 completes the process of unlocking the electric lock door 800, and changes the operating state of the electric lock door 800 to the unlocked state (Event E440). After that, the high-order host apparatus 400 sends a state change result TC2 (unlocked state) to the interface apparatus 300. The interface apparatus 300 stores the state change result TC2 (Event E330).

After that, the card reader terminal 200 temporarily switches from the third-time sleep mode to the normal mode in accordance with a timer interrupt TP3 from the timer 206 to perform polling PL3 for a third time to the interface apparatus 300. At this time, the interface apparatus 300 has the successful verification result TV1 and the state change result TC2 stored therein. When this is the case, the interface apparatus 300 sends the successful verification result TV1 to the card reader terminal 200.

When the card reader terminal 200 receives the successful verification result TV1, it lights up (Event E230) the unlock lamp 230 (FIG. 1) to indicate the unlocked state. The card verification process is thus completed, and the card user can open the electric lock door 800.

If the verification of the card data TD1 is unsuccessful, the high-order host apparatus 400 sends an unsuccessful verification result to the interface apparatus 300 after Event E420. The interface apparatus 300 stores the unsuccessful verification result, and sends the unsuccessful verification result to the card reader terminal 200 when polled by the card reader terminal 200.

In FIG. 3 and FIG. 4, the high-order host apparatus 400 receives the card data TD1 from the interface apparatus 300 at time t0. If disregard the time for the card reader terminal 200 to receive the card data TD1 from the card 100, and the time for the interface apparatus 300 to receive the card data TD1 from the card reader terminal 200, the time at which the user holds up the card 100 over the card reader terminal 200 may be regarded as time t0. Time t1 is the time when the first polling PL1 is performed. Time t2 is the time when the second polling PL2 is performed. Time t3 is the time when the high-order host apparatus 400 sends the state change result TC2 to the interface apparatus 300. Generally, when verification of card data is successful and the unlocking process is performed, time t3 is the time when the high-order host apparatus 400 changes the operating state of the electric lock door 800. Time t3 differs depending on the configuration, type, and the like of the wireless card reader system.

Figure 5:
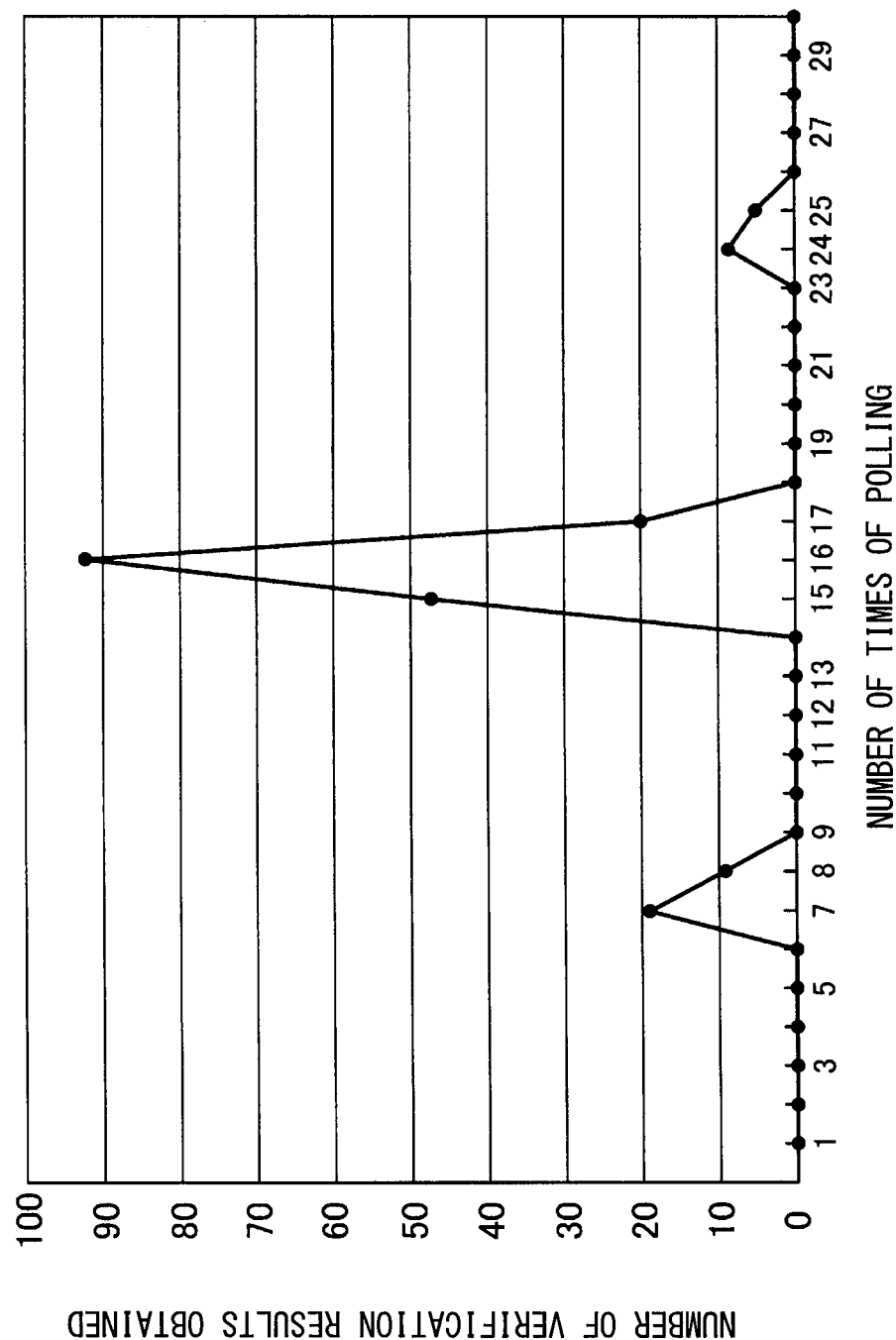
FIG. 5 is an illustrative diagram showing the relationship between the number of times of polling and the number of verification results obtained.

FIG. 5 is an illustrative diagram showing the relationship between the number of times of polling performed in the card reader terminal 200 and the number of verification results obtained of card data (successful verification results/unsuccessful verification results) obtained. The number of results obtained is the number of times of obtaining verification results when multiple cards 100 are each held up over the card reader terminal 200 once, one at a time, within a predetermined period. In the example of FIG. 5, polling is performed every 100 msec. In FIG. 5, there is a local maximum each of the number of verification results obtained when the number of times of polling is seven, sixteen, and twenty-four. When a verification result is obtained with seven polling operations, it is assumed either (i) that the verification is unsuccessful and the electric lock door 800 is not unlocked, or (ii) that while the verification is successful, the electric lock door 800 has already been unlocked. When a verification result is obtained with sixteen polling operations, it is assumed that the verification is successful, and the process of unlocking the electric lock door 800 has been performed. When a verification result is obtained with twenty-four polling operations, it is assumed that while the verification is successful, the process of unlocking the electric lock door 800 has not been performed normally.

As shown from FIG. 5, the number of verification results obtained is the largest when the number of times of polling is sixteen. In other words, provided that the verification of card data is successful and the unlocking process has been performed, 1.6 seconds (100 msec×16) are required from the time when the card 100 is held up over the card reader terminal 200 until the electric lock door 800 is unlocked, i.e., from time t0 to time t3 shown in FIG. 3 and FIG. 4. Generally, the user unconsciously waits for 1.6 seconds from the time when s/he holds up the card 100 over the card reader terminal 200 until the electric lock door 800 is unlocked. Therefore, it is assumed that the user would wait up to 1.6 seconds without feeling strange. If, however, the user has to wait for more than 1.6 sec from the time when s/he holds up the card 100 over the card reader terminal 200 until the electric lock door 800 is unlocked, the user will likely feel strange. This means that the frequency of polling performed in the card reader terminal 200 can be somewhat reduced before the time corresponding to time t3 (first time) without causing the user to feel strange, whereby power consumption of the card reader terminal 200 can be reduced.

Figure 6:
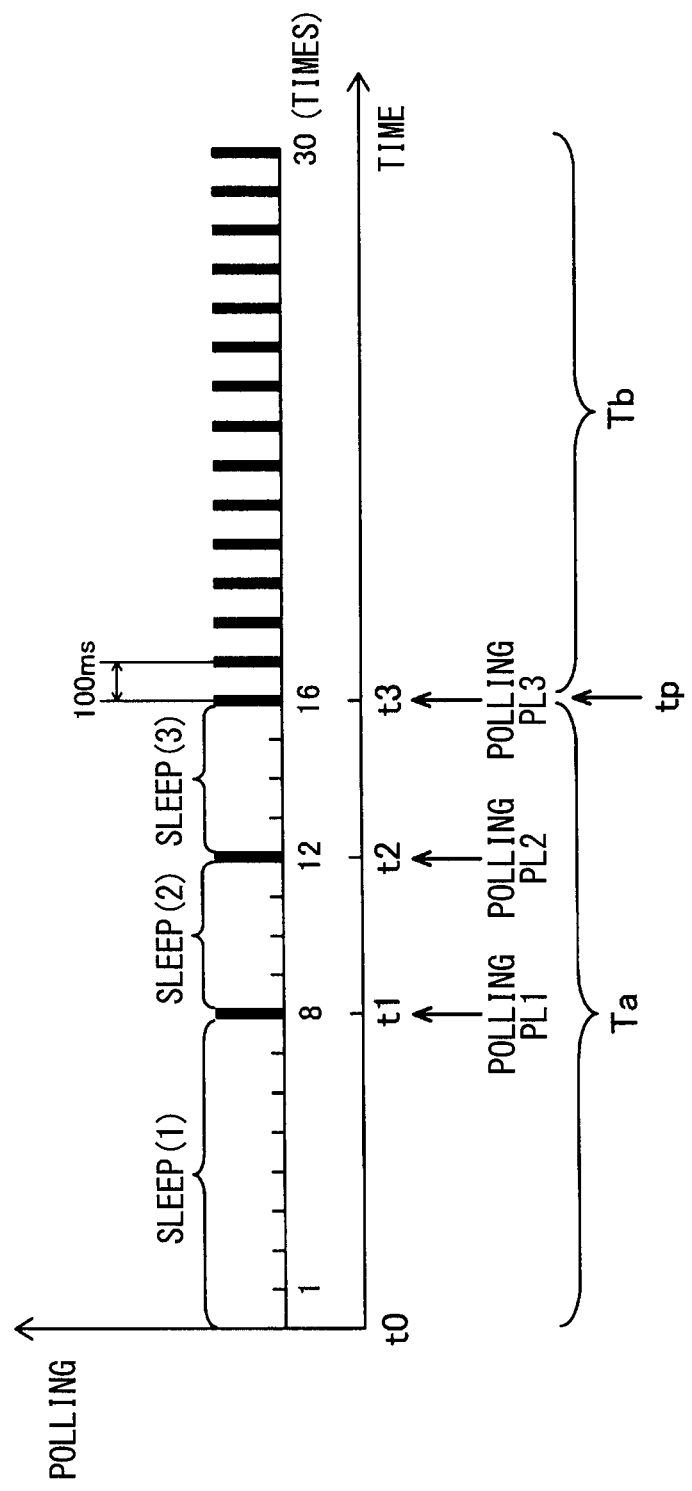
FIG. 6 is a diagram showing examples of time of polling in a card reader terminal.

FIG. 6 is an illustrative diagram showing polling times in the card reader terminal 200. The number of times of polling shown in FIG. 5 is plotted along a time axis. In FIG. 6, the thick lines represent polling. Time t0 to t3 shown in FIG. 6 correspond to time t0 to time t3 shown in FIG. 3 and FIG. 4.

In the example of FIG. 6, the period before first time tp, which corresponds to time t3, is a period before a state change Ta. The period after the first time tp is a period after a state change Tb. The polling frequency during the period before a state change Ta is lower than the polling frequency during the period after a state change Tb. The card reader terminal 200 switches to the sleep mode between one polling and the next polling during the period before a state change Ta, so that the power consumption of the card reader terminal 200 can be reduced. Since the period before a state change Ta is also a period in which the user is waiting unconsciously after holding up the card 100 over the card reader terminal 200, the reduced polling frequency during the period before a state change Ta is hardly likely to give the user a strange feeling. During the period before a state change Ta, the first polling PL1 is performed at time t1, and the second polling PL2 is performed at time t2. At first time tp, the third polling PL3 is performed. Time t1 may preferably be set at a midpoint of a period between time t0 to time tp, i.e., the period before a state change Ta. Time t2 may preferably be set at a midpoint of a period between time t1 to first time tp. Referring to FIG. 5, the number of verification results obtained is more than 0 at time t1 and at first time tp, which means that performing polling operations PL1 and PL3 respectively at time t1 and first time tp can increase the probability of obtaining verification results. During the period before a state change Ta, the card reader terminal 200 need not necessarily perform polling, or may perform polling just once.

As described above, in the first embodiment, the polling frequency in the period before a state change Ta, which is a period before first time tp corresponding to time t3 when the operating state of the electric lock door 800 is changed by the high-order host apparatus 400, is lower than the polling frequency in the period after a state change Tb, which is a period after first time tp. Since the card reader terminal 200 switches to the sleep mode that consumes less power than the normal mode between one polling and the next polling, the power consumption of the card reader terminal 200 can be reduced. Since the user waits until time t3 from the time when the card 100 is held up over the card reader terminal 200 without feeling strange, lowering the polling frequency during the period before a state change Ta before first time tp corresponding to time t3 is hardly likely to give the user a strange feeling.

Second Embodiment

Figure 7:
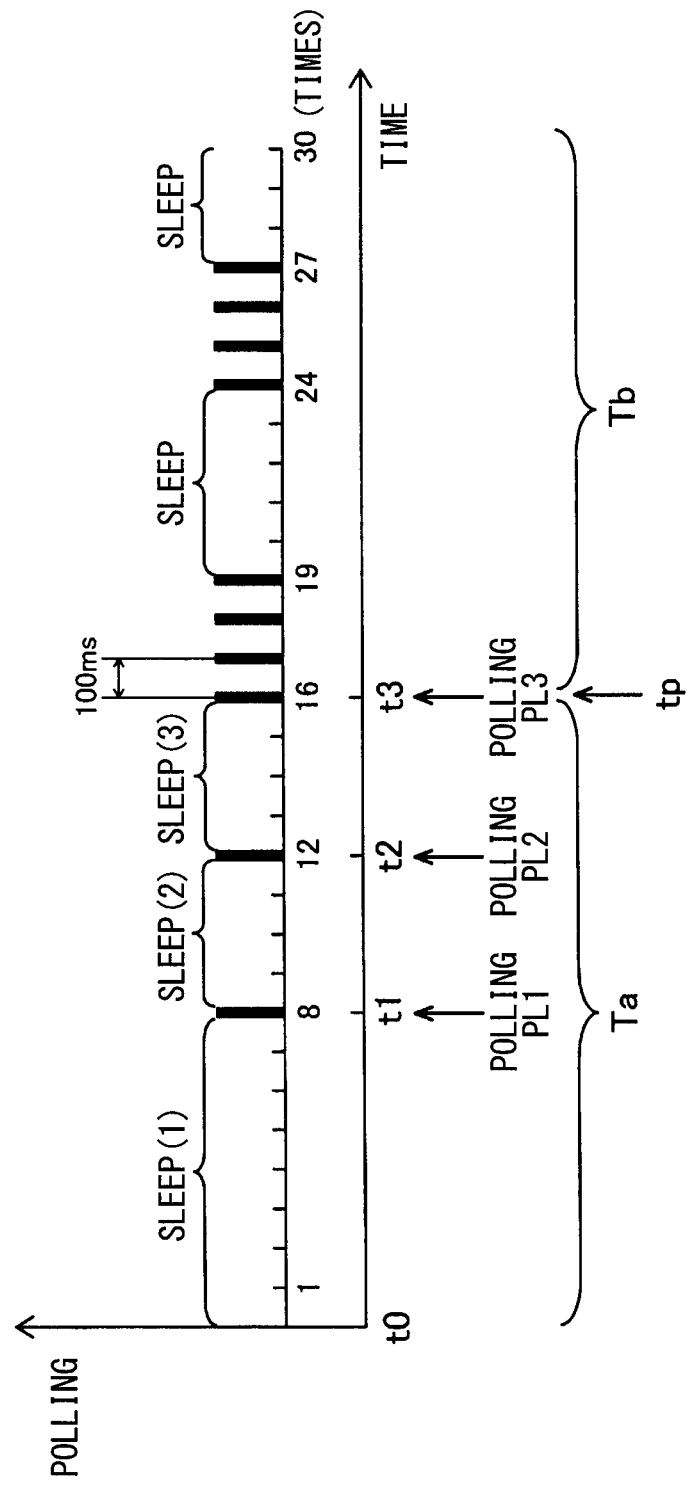
FIG. 7 is a diagram showing examples of time of polling in a second embodiment.

FIG. 7 is an illustrative diagram corresponding to FIG. 6, showing polling times in a card reader terminal 200 according to a second embodiment of the present disclosure. In FIG. 7, as compared to the first embodiment shown in FIG. 6, the number of times of polling after first time tp is reduced. Referring to FIG. 5, the number of verification results obtained is zero when the number of times of polling is 20 to 23, and 28 to 30. In FIG. 7, at times corresponding to these number of times of polling, the card reader terminal 200 does not perform polling and switches to the sleep mode. Power consumption of the card reader terminal 200 can thus be saved.

In the second embodiment, too, the polling frequency in the period before a state change Ta is lower than the polling frequency in the period after a state change Tb, so that the power consumption of the card reader terminal 200 can be reduced without giving the user a strange feeling.

While the wireless card reader system 900 is used for locking and unlocking the electric lock door 800 in the embodiments described above, the system may be applied to permission and prohibition of use or the like of other types of target devices such as electronic appliances, strongboxes, and the like. In the latter case, permission of use and prohibition of use of a target device correspond to the operating states.

According to one aspect of the present disclosure, a card reader terminal including: a card reader that reads card data stored in a card for verification; a battery that supplies electric power to the card reader terminal; a timer that generates a timer interrupt at a predetermined interval; and a controller that is configured to operate the card reader terminal in a first mode or in a second mode with lower power consumption than power consumption of the first mode, is provided. The card reader terminal in the first mode may perform polling to an interface apparatus, which wirelessly communicates with the card reader terminal and relays communication between the card reader terminal and a high-order host apparatus. The card reader terminal in the second mode may not performs the polling to the interface apparatus. The controller causes the card reader terminal to perform the polling to the interface apparatus less frequently in a period before the high-order host apparatus changes an operating state of a target device than in a period after the operating state of the target device has been changed.

Controllers and methods described in the present disclosure may be implemented by a special purpose computer created by configuring a memory and a processor programmed to execute one or more particular functions embodied in computer programs. Alternatively, the controllers and the methods described in the present disclosure may be implemented by a special purpose computer created by configuring a processor provided by one or more special purpose hardware logic circuits. Further alternatively, the controllers and the methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

While various embodiments, configurations, and aspects of a wireless card reader system according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:

1. A wireless card reader system comprising:
    a card reader terminal that is battery-driven and obtains card data stored in a card for verification;
    a high-order host apparatus that verifies the card data, changes an operating state of a target device when a verification result is successful, and sends the verification result; and
    an interface apparatus that relays communication between the card reader terminal and the high-order host apparatus,
    wherein:
    the card reader terminal is operable in a normal mode or in a sleep mode with a lower power consumption than a power consumption of the normal mode;
    the card reader terminal switches from the normal mode to the sleep mode after sending the card data to the interface apparatus in the normal mode;
    the card reader terminal temporarily returns from the sleep mode to the normal mode to perform polling, which is an operation to send an inquiry for the verification result to the interface apparatus, and obtains the verification result sent from the high-order host apparatus to the interface apparatus;
    a first time is a time at which the operating state of the target device is changed by the high-order host apparatus;
    a period before a state change is a period before the first time;
    a period after the state change is a period after the first time; and
    the polling is performed less frequently in the period before the state change than in the period after the state change.

2. The wireless card reader system according to claim 1, wherein:
    the high-order host apparatus sends a successful verification result and a state change result of the operating state to the interface apparatus when the verification of the card data is successful; and
    the high-order host apparatus sends an unsuccessful verification result to the interface apparatus without changing the operating state when the verification of the card data is unsuccessful.

3. The wireless card reader system according to claim 2, wherein:
    the interface apparatus includes a memory;
    the memory stores the verification result and the state change result of the operating state sent from the high-order host apparatus; and
    when the interface apparatus is polled:
        the interface apparatus sends the successful verification result to the card reader terminal in a case where both the successful verification result and the state change result have been stored,
        the interface apparatus sends a response indicating that the state change is ongoing to the card reader terminal in a case where, of the successful verification result and the state change result, only the successful verification result has been stored, and
        the interface apparatus sends the unsuccessful verification result to the card reader terminal in a case where the unsuccessful verification result has been stored.

4. The wireless card reader system according to claim 3, wherein:
    the card reader terminal switches from the normal mode to the sleep mode after receiving the response indicating that the state change is ongoing from the interface apparatus.

5. The wireless card reader system according to claim 1, wherein:
    the card reader terminal performs the polling at the first time.

6. The wireless card reader system according to claim 1, wherein:
    the target device is an electric lock door; and
    the operating state includes a locked state and an unlocked state of the electric lock door.

* * * * *